United States Patent
Park et al.

(10) Patent No.: US 9,578,451 B2
(45) Date of Patent: Feb. 21, 2017

(54) METHOD AND DEVICE FOR PERFORMING WIRELESS CONNECTION BETWEEN DEVICES IN WIRELESS COMMUNICATION SYSTEM

(71) Applicant: LG ELECTRONICS INC., Seoul (KR)

(72) Inventors: Jangwoong Park, Seoul (KR); Jaeho Lee, Seoul (KR); Minsoo Lee, Seoul (KR); Hyeonjae Lee, Seoul (KR); Seungryul Yang, Seoul (KR); Younghwan Kwon, Seoul (KR); Jinpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/029,528

(22) PCT Filed: Oct. 16, 2014

(86) PCT No.: PCT/KR2014/009737
§ 371 (c)(1),
(2) Date: Apr. 14, 2016

(87) PCT Pub. No.: WO2015/056995
PCT Pub. Date: Apr. 23, 2015

(65) Prior Publication Data
US 2016/0277873 A1 Sep. 22, 2016

Related U.S. Application Data

(60) Provisional application No. 61/893,276, filed on Oct. 20, 2013, provisional application No. 61/907,337, filed on Nov. 21, 2013.

(51) Int. Cl.
*H04B 1/00* (2006.01)
*H04W 4/00* (2009.01)
(Continued)

(52) U.S. Cl.
CPC .......... *H04W 4/008* (2013.01); *H04L 25/4906* (2013.01); *H04W 8/005* (2013.01); *H04W 48/16* (2013.01); *H04W 76/023* (2013.01)

(58) Field of Classification Search
CPC ...... H04W 8/005; H04R 25/554; H04R 3/005; H04M 1/7253; H04M 1/6066; H04M 1/6091; H04M 2250/02; H03M 3/04; H03M 3/424; H04H 60/58
(Continued)

(56) References Cited

U.S. PATENT DOCUMENTS

| 2011/0085455 A1* | 4/2011 | Wu ..................... H04W 72/082 370/252 |
| 2013/0122814 A1 | 5/2013 | Shen et al. |
| 2013/0276063 A1 | 10/2013 | Hahm et al. |

FOREIGN PATENT DOCUMENTS

| KR | 10-1127148 B1 | 3/2012 |
| KR | 10-2013-0082337 A | 7/2013 |
| KR | 10-2013-0107188 A | 10/2013 |

* cited by examiner

*Primary Examiner* — Tu X Nguyen
(74) *Attorney, Agent, or Firm* — Birch, Stewart, Kolasch & Birch, LLP

(57) ABSTRACT

In a method for performing wireless connection among devices in a wireless communication system, the method according to the present invention comprises activating a wireless connection function; transmitting a ping tone for discovering one or more second devices in the surroundings; receiving a response tone with respect to the ping tone from the one or more second devices; based on the received response tone, transmitting a connection request tone for requesting wireless connection to the second device; and receiving a connection, response tone corresponding to a response of the connection request tone from the second device.

20 Claims, 13 Drawing Sheets

(51) Int. Cl.
*H04W 8/00* (2009.01)
*H04W 76/02* (2009.01)
*H04L 25/49* (2006.01)
*H04W 48/16* (2009.01)

(58) Field of Classification Search
USPC .......................................................... 455/702
See application file for complete search history.

<Conversion matrix>

| Duration time / Frequency | T(1) | T(2) | ... | T(N) |
|---|---|---|---|---|
| f(1) | | | | |
| f(2) | | | | |
| ⋮ | | | | |
| f(n) | | | | |

(a)

| | 8octave | | | | |
| | Duration time / Frequency | T1 | T2 | T3 | |
| 1octave | | | | | |
| Duration time / Frequency | T1 | T2 | T3 | | |
| 32.7032 (C) | 0x00 | 0x01 | 0x02 | | |
| 34.6478 (C#) | 0x03 | 0x04 | 0x05 | | |
| 36.7081 (D) | 0x06 | 0x07 | 0x08 | | |
| 38.8909 (D#) | 0x09 | 0x0a | 0x0b | | |
| 41.2034 (E) | 0x0c | 0x0d | 0x0e | | |
| 43.6535 (F) | 0x0f | 0x10 | 0x11 | | |
| 46.2493 (F#) | 0x12 | 0x13 | 0x14 | | |
| 48.9994 (G) | 0x15 | 0x16 | 0x17 | | |
| 51.9130 (G#) | 0x18 | 0x19 | 0x1a | | |
| 55.0000 (A) | 0x1b | 0x1c | 0x1d | | |
| 58.2705 (A#) | 0x1e | 0x1f | 0x20 | | |
| 61.7354 (B) | 0x21 | 0x22 | 0x23 | | |

(b)

(c)

BD_ADDR: 48-bit Bluetooth device address
CLK: 28-bit Bluetooth clock

METHOD AND DEVICE FOR PERFORMING WIRELESS CONNECTION BETWEEN DEVICES IN WIRELESS COMMUNICATION SYSTEM

CROSS REFERENCE TO RELATED APPLICATIONS

This application is the National Phase of PCT International Application No. PCT/KR2014/009737, filed on Oct. 16, 2014, which claims priority under 35 U.S.C. 119(e) to U.S. Provisional Application No. 61/893,276, filed on Oct. 20, 2013 and 61/907,337, filed on Nov. 21, 2013, all of which are hereby expressly incorporated by reference into the present application.

TECHNICAL FIELD

The present invention is related to a method and an apparatus for performing wireless connection among devices in a wireless communication system.

BACKGROUND ART

According to the wide spread of smartphones, multimedia contents, screens, and non-contents are shared in various ways and frequently among devices through wireless communication technologies.

As one example, Bluetooth is used for sharing a photo, music file, address book, or memo. Likewise, Wi-Fi P2P technology is used for sharing screens to allow a screen of one device to appear on a screen of another device.

In order to perform a series of tasks involved in the contents sharing above, however, a wireless connection function has to be activated beforehand by the user for each of the devices participating in the contents sharing, and a process for discovering a target device compliant with the corresponding wireless communication technology should be performed.

However, a user who has low understanding of the wireless communication function offered by existing technologies may be readily confronted with a difficulty of handling the devices while directly trying to activate the corresponding wireless communication function. Also, even for a user who is familiar with the wireless communication function, he has to endure the inconvenience of activating the corresponding wireless communication functions one by one.

Moreover, even if the corresponding wireless communication function is activated at all, the user may still find it difficult to select a target device because of device-dependent names unfamiliar to the user (for example, model name or hardware address) during a process of discovering the target device and displaying a list of discovered devices to the user.

Furthermore, even if the user is familiar with the device-dependent name of the corresponding device, the user still has to face an inconvenience of searching for the target device one after another in case a list of searched devices is large.

DISCLOSURE

Technical Problem

The present invention has been made in an effort to define a conversion matrix for converting input binary data to a sound signal having specific frequency and specific duration time.

Also, the present invention has been made in an effort to provide a method for activating a wireless connection function of a remote device without intervention of a user by using a sound signal of a specific pattern generated through a conversion matrix.

Also, the present invention has been made in an effort to provide a method for wireless communication connection between an initiating device and a remote device without intervention of a user by using a sound signal of a specific pattern generated through a conversion matrix.

Technical objects of the present invention are not limited to those objects described above; other technical objects not mentioned above can be clearly understood from what are described below by those skilled in the art to which the present invention belongs.

Technical Solution

In a method for performing wireless connection among devices in a wireless communication system according to the present invention, the method performed by a first device comprises activating a wireless connection function; transmitting a ping tone for discovering one or more second devices in the surroundings; receiving a response tone with respect to the ping tone from the one or more second devices; based on the received response tone, transmitting a connection request tone for requesting wireless connection to the second device; and receiving a connection response tone corresponding to a response of the connection request tone from the second device, wherein the ping tone, the response tone, the connection response tone, and the connection response tone are generated by a conversion matrix, and the conversion matrix converts an input binary data to a sound signal having specific frequency and specific duration time.

Also, the transmitting a connection request tone according to the present invention further comprises outputting a list of the one or more second devices through an output unit in case a response tone is received from the one or more second devices; and transmitting the connection request tone to one of the one or more second devices.

Also, the method according to the present invention further comprises, in case a response tone is received from the one or more second devices, checking whether collision of the received response tone occurs; and in the case of collision of the response tone, retransmitting the ping tone to the one or more devices.

Also, generation of the ping tone, the response tone, the connection request tone, and the connection response tone according to the present invention comprises receiving binary data of N bits; and converting the received binary data to a sound signal of a specific pattern by using a conversion matrix defined by frequency and duration time.

Also, the method according to the present invention further comprises comparing a bit length of the received binary data with a bit length that the conversion matrix supports; as a comparison result, if a bit length of the received binary data is large, adding a predetermined number of padding bits to the bit length of the received binary data so that the bit length of the received binary data can be an integer multiple of the bit length that the conversion matrix supports; partitioning the binary data with the additional padding bits by units of the bit length that the conversion matrix supports; and processing the individual partitioned binary data in a sequential or parallel manner by using the conversion matrix.

Also, the response tone in response to the ping tone and the connection response tone according to the present invention are received from the one or more second devices after random back-off.

Also, the random back-off value with respect to the connection response tone according to the present invention is the value obtained by multiplying the last random back-off value of a response tone with respect to the ping tone with a coefficient K which takes into account the length of the connection response tone.

Also, the connection request tone according to the present invention includes information related to the first device required for the wireless connection, and the connection response tone according to the present invention includes information related to the second device required for the wireless connection.

Also, information related to the first device according to the present invention includes at least one of address information of the first device or native clock information.

Also, the first device according to the present invention is an initiating device, and the second device according to the present invention is a remote device corresponding to an initiated device.

Also, in a method for performing wireless connection among devices in a wireless communication system according to the present invention, the method performed by a second device comprises receiving a ping tone for discovering neighboring devices from a first device; transmitting a response tone with respect to the ping tone from the first device; receiving a connection request tone for requesting wireless connection from the first device; transmitting a connection response tone to the first device in response to the connection request tone; and activating the wireless connection function, wherein the ping tone, the response tone, the connection request tone, and the connection response tone are generated by a conversion matrix, and the conversion matrix converts an input binary data to a sound signal having specific frequency and specific duration time.

Also, the method according to the present invention further comprises performing random back-off after receiving the ping tone and the connection request tone.

Also, the method according to the present invention further comprises checking a response tone with respect to the ping tone of neighboring remote devices and transmission of the connection response tone; and re-performing the random back-off a predetermined number of times in case a response tone with response to the ping tone of the neighboring remote devices and transmission of the connection response tone are detected from the checking result.

Also, in a method for performing wireless connection among devices in a wireless communication system according to the present invention, a first device comprises a communication unit for transmitting and receiving a signal to and from the outside in a wired and/or wireless manner; and a controller functionally connected to the communication unit, wherein the controller is configured to activate a wireless connection function, transmit a ping tone for discovering one or more second devices in the surroundings, receive a response tone with respect to the ping tone from the one or more second devices, based on the received response tone, transmit a connection request tone for requesting wireless connection to a second device, and receive a connection response tone corresponding to a response of the connection request tone from the second device, wherein the connection request tone includes information related to the first device required for the wireless connection; the ping tone, the response tone, the connection request tone, and the connection response tone are generated by a conversion matrix; and the conversion matrix converts an input binary data to a sound signal having specific frequency and specific duration time.

Also, the first device according to the present invention further comprises a data processing device functionally connected to the communication unit and the controller, wherein the data processing device receives binary data of N bits and converts the input binary data to a sound signal of a specific pattern by using a conversion matrix defined in terms of frequency and duration time.

Also, the data processing device according to the present invention comprises a comparing unit comparing a bit length of input binary data with a bit length that the conversion matrix supported; a padding unit adding a predetermined number of padding bits to a bit length of the input binary data so that the bit length of the input binary data can be an integer multiple of the bit length that the conversion matrix supports; a partitioning unit partitioning the binary data with the additional padding bits by units of the bit length that the conversion matrix supports; and a converting unit converting the individual partitioned binary data in a sequential or parallel manner by using the conversion matrix.

Also, the controller according to the present invention is configured to output a list of the one or more second devices through an output unit in case a response tone is received from the one or more second devices and to transmit the connection request tone to one of the one or more second devices.

Also, the controller according to the present invention is configured to check collision of a received response tone if the response tone is received from the one or more second devices and in the case of collision of the response tone, to retransmit the ping tone to the one or more second devices.

Also, according to the present invention, in case a response tone with respect to the ping tone includes information related to a second device, the connection response tone is not transmitted to the first device.

Advantageous Effects

The present invention can transmit input binary data to be transmitted as a sound signal by effectively converting the input binary data by using a conversion matrix defined in terms of specific frequency and specific duration time.

The present invention can ease sharing of multimedia contents, screen, and non-contents among devices by employing a sound signal generated through a conversion matrix for activating a wireless connection function of a device and wireless communication connection among devices.

The advantageous effects that can be obtained from application of the present invention are not limited to the aforementioned effects, but other advantageous effects not mentioned above will be clearly understood from the descriptions below by those skilled in the art to which the present invention belongs.

MODE FOR INVENTION

In what follows, preferred embodiments according to the present invention will be described in detail with reference to appended drawings. The detailed descriptions given below with reference to appended drawings are intended only to provide illustrative embodiments of the present invention and do not represent the only embodiments thereof. The detailed descriptions of the present invention below include specific details for the purpose of comprehensive understanding of the present invention. However, those skilled in the art may readily understand that the present invention can be implemented without those specific details.

For some case, in order to avoid inadvertently making the technical concept of the present invention obscured, the structure and the apparatus well-known to the public can be omitted or illustrated in the form of a block diagram with respect to essential functions of the structure and the apparatus.

Figure 1:
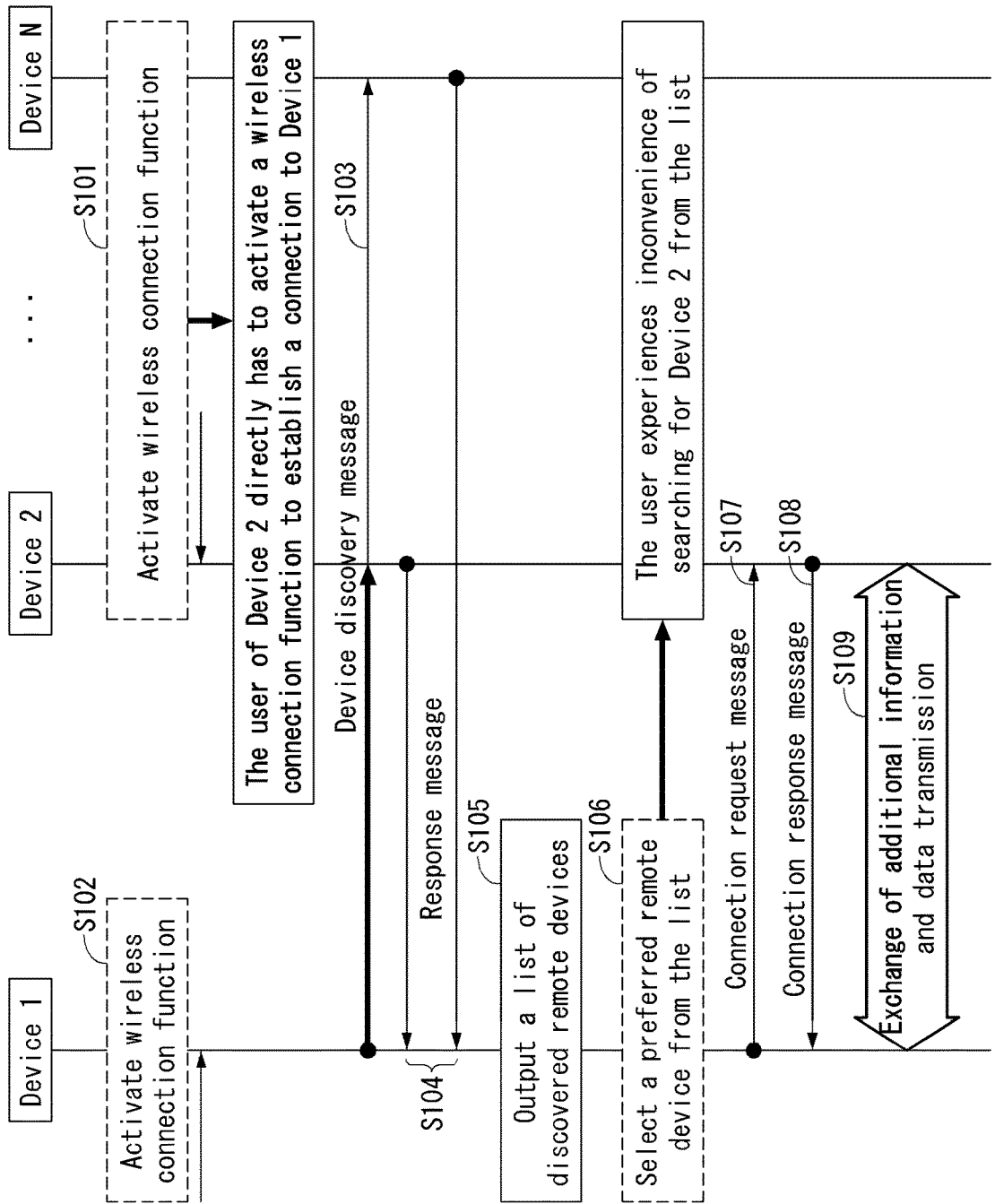
FIG. 1 illustrates one example of a method for activating a wireless communication function of a remote device and a method for connecting to the remote device according to the present invention.

FIG. 1 illustrates one example of a method for activating a wireless communication function of a remote device and a method for connecting to the remote device according to the present invention.

As shown in FIG. 1, device users activate a wireless connectivity function of each device to establish wireless connectivity among devices by using a short range communication technology such as Bluetooth or Wi-Fi.

In other words, a plurality of devices (Device 1, Device 2, . . . , Device N) receive an input commanding turning-on of a wireless connection function from users of the respective devices and activate the wireless connection function S101.

In FIG. 1, Device 1 requests connection, corresponding to an initiating device, and Device 2 to N perform short range wireless communication through connection to the Device 1, corresponding to remote devices.

Afterwards, the Device 1 receives a user input for performing a remote device discovery function S102.

In other words, the user of the Device 1 (user 1) turns on or activates a remote device discovery function of the Device 1 to discover a remote device capable of performing short range communication with the Device 1.

Afterwards, the Device 1 broadcasts a device discovery message for discovering remote devices located within detection or connection range S103.

Afterwards, at least one remote device receiving a device discovery message transmitted from the Device 1 transmits a response message including the information of the remote device to the Device 1 to inform the Device 1 of existence of the remote device S104.

At this time, the response message is a message corresponding to a response of the device discovery message.

In other words, the Device 1 receives a response message with respect to the device discovery message from a remote device which receives the device discovery message.

Next, the Device 1 outputs a list of remote devices discovered on the basis of the response message, namely the remote devices which have transmitted the response message through the display unit (or output unit) so that the user can see the list S105.

Afterwards, the Device 1 receives a selection input of the user with respect to one of the displayed remote devices S106.

FIG. 1 illustrates a case where the Device 1 selects a Device 2 as a remote device to be connected.

In other words, in the case of FIG. 1, the user directly selects a remote device to be connected for establishing wireless connection to a particular remote device.

Afterwards, the Device 1 transmits a connection request message to the remote device selected as an initiated device (Device 2) S107.

Afterwards, the Device 1 receives a connection response message from the Device 2 as a response for the connection request message S108.

After the S108 step is completed, the Device 1 and the Device 2 exchange additional information for completing wireless connection and transmit and receive actual data S109.

In the case of FIG. 1, however, the user experiences inconvenience such that the user has to directly activate a wireless connection function of a device to perform wireless connection among devices and select a target device to be connected among the remote devices discovered.

Internal Block Diagram of Devices

Figure 2:
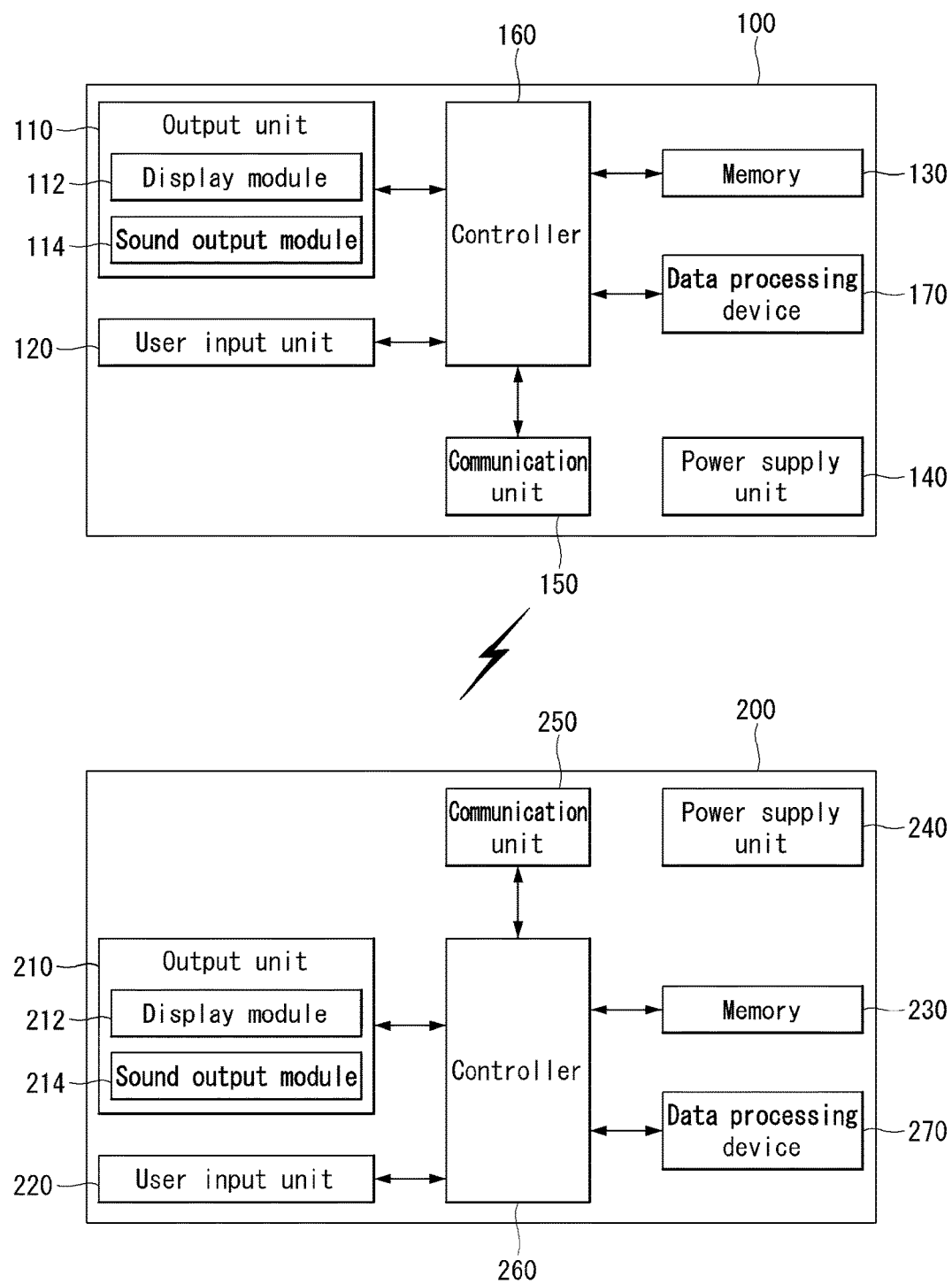
FIG. 2 illustrates one example of an internal block diagram of devices to which methods according to the present invention can be applied.

FIG. 2 illustrates one example of an internal block diagram of devices to which methods according to the present invention can be applied.

An initiating device 100 refers to a device transmitting a request message giving a command to a initiated device 200 or receiving and processing a request message from the initiated device 200.

After transmitting a request message to the initiated device 200, the initiating device 100 processes a response message transmitted from the initiated device and provides a UI to the user.

Also, the initiating device 100 receives and processes a request message requested from the initiated device and provides a UI to the user.

The initiated device 200 refers to a device transmitting a request message giving a command to an initiating device or receiving and processing a request message requested by the initiating device.

The initiated device 200 can be called a remote device.

Also, the initiated device 200 transmits a request message to the initiating device, receives and processes a response message transmitted from the initiating device, and provides a UI to the user.

The initiating device 100 and the initiated device 200 can be a personal computer, PDA, mobile phone, remote controller, TV, headphone, or AV device (car system, headphone, player/recorder, timer, tuner, monitor, and so on).

The initiating device 100 and the initiated device 200 can include an output unit 110, 210, user interface unit 120, 220, memory 130, 230, power supply unit 140, 240, communication unit 150, 250, controller (processor) 160, 260, and data processing device 170, 270, respectively.

The output unit, user interface unit, memory, power supply unit, communication unit, and controller are connected functionally to each other to perform a method of the present invention.

The constituting elements shown in FIG. 2 are not essential; therefore, an electronic device may be implemented with more or fewer elements than as shown in FIG. 2.

The output unit 110, 210 is intended to produce an output related to visual, aural or tactile sensing, which can include a display module 112, 212 and sound output module 114, 214.

The display module 112, 212 displays information processed in the device. For example, in case the device is in a telephone mode, a User Interface (UI) or a Graphic User Interface (GUI) related to telephone conversation is displayed. In case the device is in a voice telephone mode or capture mode, a capture image and/or received image or UI or GUI is displayed.

The display module 112, 212 can include at least one of liquid crystal display, thin film transistor liquid crystal display, organic light emitting diode, flexible display, and 3D display.

The sound output module 114, 214 can output audio data received from the communication unit 150, 250 under a call signal receive mode, telephone mode or recording mode, voice recognition mode, or broadcasting receive mode; or stored in the memory 130, 230. The sound output module 114, 214 outputs a sound signal related to a function (for example, a call signal reception sound or message reception sound) carried out in the device. The sound output module 114, 214 can include a receiver, speaker, buzzer, and microphone.

The microphone can receive a tone transmitted from a corresponding device, and the speaker can transmit a tone to the corresponding device.

At this time, a tone refers to a signal converted to a sound through a conversion matrix from binary data to be described later.

The user input unit 120, 220 generates input data for the user to control operation of a device. The user input unit 120, 220 can be made of a key pad, dome switch, touch pad (pressure sensing/capacitive sensing type), jog wheel, and jog switch.

The memory 130, 230 can store a program for operating the controller 160, 260 and temporarily store input/output data. The memory 130, 230 can store data related to vibration and sound of various patterns generated when a touch input is applied on the touch screen.

The memory 130, 230 is such a kind of medium storing various types of information of a device and being connected to the controller, stores a program for operation of the controller 160, 260, applications, normal files and input/output data.

The memory 130, 230 can include at least one type of storage medium from among memory of flash memory type, hard disk type, multimedia card micro type, or card type (for example, SD or XD memory); Random Access Memory (RAM), Static Random Access memory (SRAM), Read Only Memory (ROM), Electrically Erasable Programmable Read Only Memory (EEPROM), Programmable Read Only Memory (PROM), magnetic memory, magnetic disk, and optical disk.

The power supply unit 140, 240 refers to a module receiving external or internal power under the control of the controller 160, 260 and providing power required for operation of each constituting element.

The communication unit 160, 260 can include one or more modules enabling wireless communication between a device and a wireless communication system or between a device and a network in which the device is located. For example, the communication unit 160, 260 can include a broadcasting receiving module (not shown), mobile communication module (not shown), wireless Internet module (not shown), and short range communication module (not shown).

The communication unit 160, 260 can be called a transmission/reception unit.

The mobile communication module transmits and receives a radio signal to and from at least one of a base station, external device, and server on a mobile communication network. The radio signal can include various forms of data according to a voice call signal, video telephone conversation call signal or text/multimedia message transmission and reception.

The wireless Internet module refers to a module for accessing wireless Internet, which can be installed inside or outside a device. A wireless Internet technology can be realized by using WLAN (Wireless LAN)(WiFi), Wibro (Wireless broadband), Wimax (World Interoperability for Microwave Access), or HSDPA (High Speed Downlink Packet Access).

The device can establish Wi-Fi P2P (Peer-to-Peer) connection with anther device through the wireless Internet module. Through the Wi-Fi P2P connection, the device can provide a streaming service between devices, perform data transmission/reception, or provide a printing service, being connected to a printer.

The short-range communication module refers to a module for short range communication. A short range communication technology can be realized by using Bluetooth, RFID (Radio Frequency Identification), IrDA (Infrared Data Association), UWB (Ultra Wideband), or ZigBee.

Also, the communication unit 150, 250 enables transmission of data or a message such as a command, request, action, and response between initiating device and initiated device.

The controller 160, 260 refers to a module for controlling the overall operation of the initiating device and the initiated device and is capable of requesting the device to transmit a message through a Bluetooth interface and other communication interface and controlling the device to process a received message.

The controller 160, 260 can also be called a microcontroller or microprocessor; the controller 160, 260 can be implemented by hardware, firmware, software, or a combination thereof.

The controller 160, 260 can include Application-Specific Integrated Circuit (ASIC), other chipset, logical circuit and/or data processing device.

The data processing device 170 included in the initiating device converts N bits of input binary data to a sound signal of a specific pattern, namely a tone of a specific pattern.

To this purpose, the data processing device 170 comprises a comparing unit, padding unit, partitioning unit, and converting unit. The data processing device will be described in more detail below with reference to FIG. 3.

Also, the data processing device 270 included in the initiated device converts a tone of a specific pattern received from the outside to binary data of N bits. To this purpose, the data processing device 270 comprises an inverse converting unit, merging unit, and removing unit.

The inverse converting unit, merging unit, and removing unit perform the inverse functions of the comparing unit, padding unit, partitioning unit, and converting unit included in the data processing device 170, which may be expressed by other terms.

The inverse converting unit converts a tone of a specific pattern into binary data of a specific length by mapping the tone into an inverse conversion matrix. At this time, the specific length represents a length that the inverse conversion matrix supports.

One or more binary data can be converted to have the specific length.

The merging unit merges a plurality of binary data output from the inverse converting unit into one binary data sequence.

The removing unit determines whether padding bits have been added to the binary data sequence output from the merging unit and in case padding bits are found, removes the corresponding padding bits.

In what follows, described in detail will be a method for activating a wireless communication function by converting a data signal to a sound signal of a specific pattern and connecting to a remote device to remove the user's inconvenience experienced from the example of FIG. 1.

First, described will be a definition of a conversion matrix to which methods of the present invention are applied and a method for converting binary data to a sound signal of a specific pattern by using the conversion matrix.

Figures 3, 4:
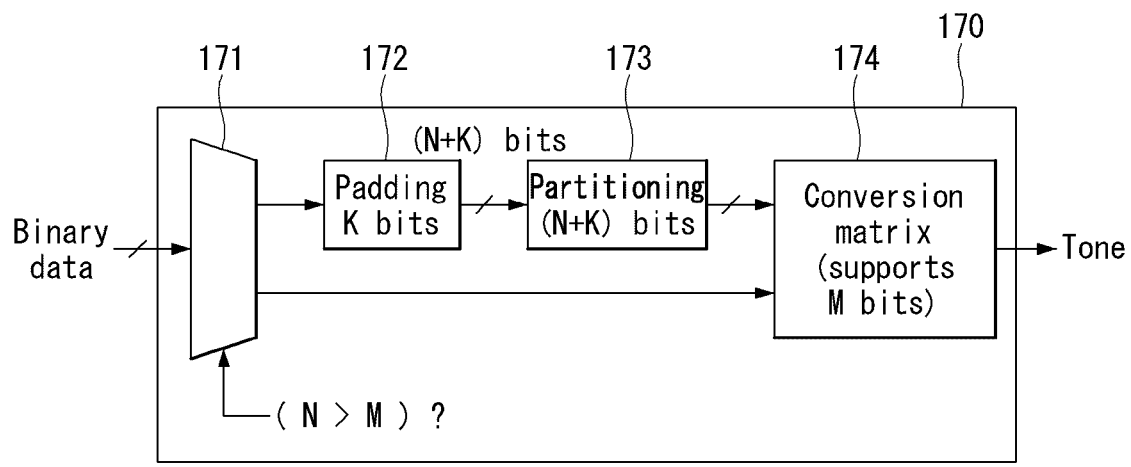
FIG. 3 illustrates one example of a conversion matrix according to the present invention.
FIG. 4 illustrates one example of an internal block diagram of a data processing device according to the present invention.

FIG. 3 illustrates one example of a conversion matrix according to the present invention.

To express binary data of N bits as a sound signal (or tone) efficiently, a conversion matrix is predefined by using "frequency" corresponding to each sound signal and "duration" for which each sound signal lasts.

As shown in FIG. 3, a column of the conversion matrix can represent duration 310 while a row of the conversion matrix can represent frequency 320.

More specifically, conversion from binary data to a sound signal is performed by fragmenting binary data of N bits (where N is a natural number) by the unit of a bit length that can be expressed in the conversion matrix, mapping the fragments into the conversion matrix, and generating mapped frequency during a mapped time duration. The frequency generated through the conversion matrix can be output through a speaker of a device sequentially according to the order of binary data bit sequences or output through the speaker of the device after being processed in parallel and merged together.

FIG. 4 illustrates one example of an internal block diagram of a data processing device according to the present invention.

As shown in FIG. 4, the data processing device 170 comprises a comparing unit 171, padding unit 172, partitioning unit 173, and converting unit 174.

The padding unit 172 and the partitioning unit 173 can be omitted or added according to a bit length of binary data input to the comparing unit 171.

The data processing device 170 performs the role of converting binary data of N bits into a sound signal of a specific pattern, namely tone of a specific pattern.

The comparing unit 171 compares the size of input binary data with that of data that the conversion matrix of the converting unit supports.

As one example, it is assumed that the size of binary data input to the comparing unit 171 is N bit, and the length of data supported by the conversion matrix is M bit.

At this time, in case the size (N) of input binary data is larger than the size of data supported by the conversion matrix (N>M), the partitioning unit partitions the length of the input binary data by length units of the data supported by the conversion matrix.

At this time, in order to prepare the input binary data to be partitioned by an integer number of M bit units, the padding unit 172 adds K padding bits to the N bits before partitioning the input binary data.

Through the padding operation, the binary data partitioned into individual blocks of bits are input to the converting unit 174 in a sequential or parallel manner.

Also, in case the size (N) of input binary data is smaller than the size (M) of the data supported by the conversion matrix, input binary data are input directly to the converting unit 174 without padding and partitioning. In this case, the data processing device 170 does not include the padding unit and the partitioning unit.

As described above, a plurality of data streams output through the partitioning unit 173 are input to the converting unit 174 in a sequential or parallel fashion, and a single data stream not partitioned is input to the converting unit 174, being converted in the converting unit to a tone of a specific pattern having specific frequency and specific time duration according to the conversion matrix (or mapping table).

At this time, n and N value are determined by the number of all possible cases to express the binary data consisting of M bits.

n represents a plurality of data streams input to the converting unit.

For example, if M is 8, the number of all possible cases for expressing binary data of 8 bits is 256 ranging from 0x00 (0) to 0xFF (255).

In other words, n and N can be determined so that n×N=256.

Figure 5:
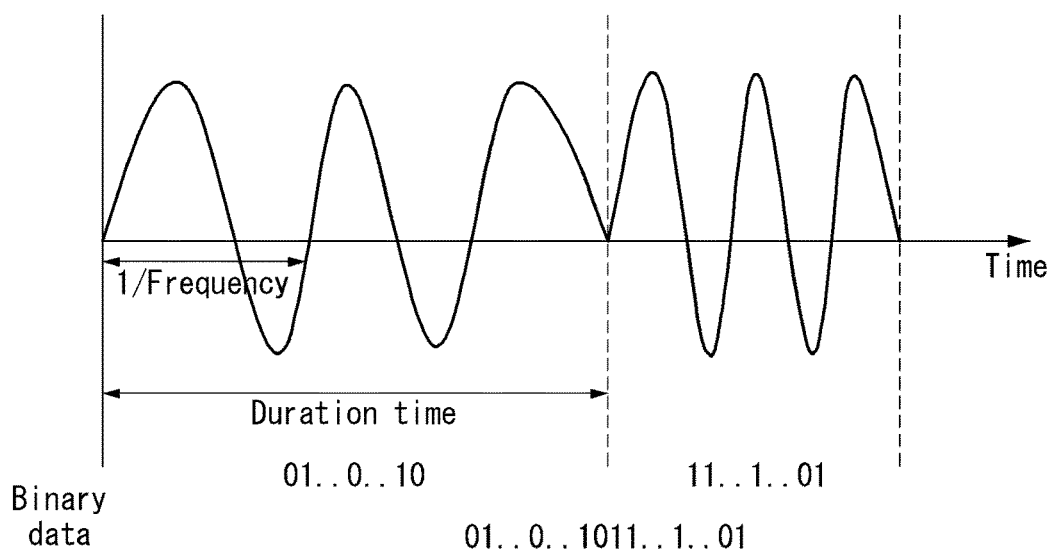
FIG. 5 illustrates one example of tones output through a conversion matrix according to the present invention.

FIG. 5 illustrates one example of tones output through a conversion matrix according to the present invention.

As shown in FIG. 5, input binary data (01 . . . 0 . . . 1011 . . . 1 . . . 01) can be converted to a signal of a specific pattern having specific frequency and specific duration through a conversion matrix.

Figure 6:
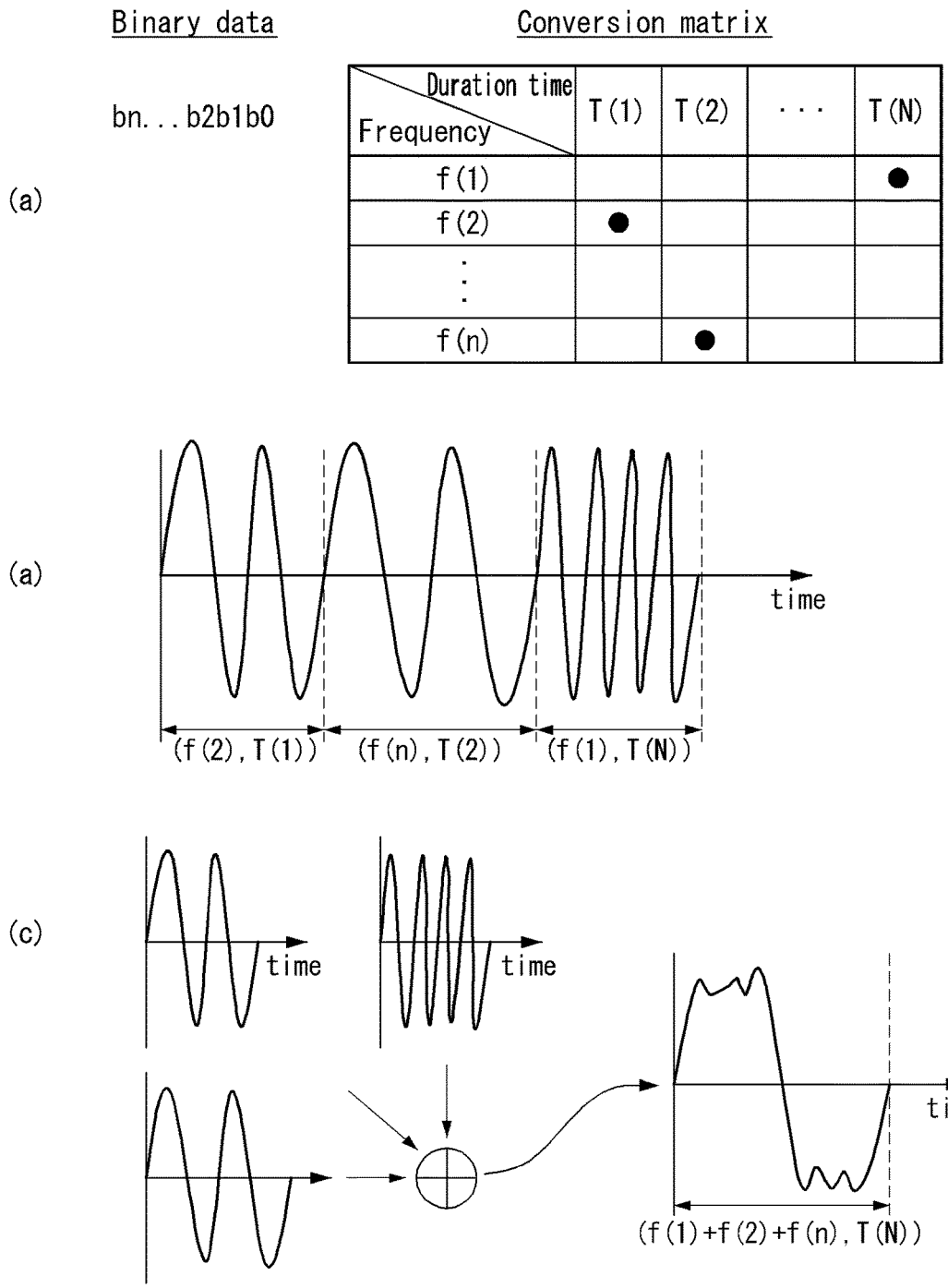
FIG. 6 illustrates one example of a tone output through a conversion matrix and a converting unit according to the present invention.

FIG. 6 illustrates one example of a tone output through a conversion matrix and a converting unit according to the present invention.

With reference to FIG. 6, the binary data (bn ... b2b1b0) of N bits are partitioned into three data streams through the partitioning unit, and each data stream is input to the converting unit and output as a tone specified by the corresponding (frequency, duration) pair: (f(2), T(1)), (f(n), T(2)), and (f(1), T(N)).

FIG. 6a is one example of the conversion matrix, and FIG. 6b shows output tones when each data stream is input to the converting unit in a sequential manner; FIG. 6c shows an output tone obtained by merging three tones generated after the individual data streams are input to the converting unit in a parallel fashion.

Next, described will be a method for activating a wireless communication function and a method for requesting connection with respect to a single remote device by using the methods of FIGS. 3 to 6.

Figure 7:
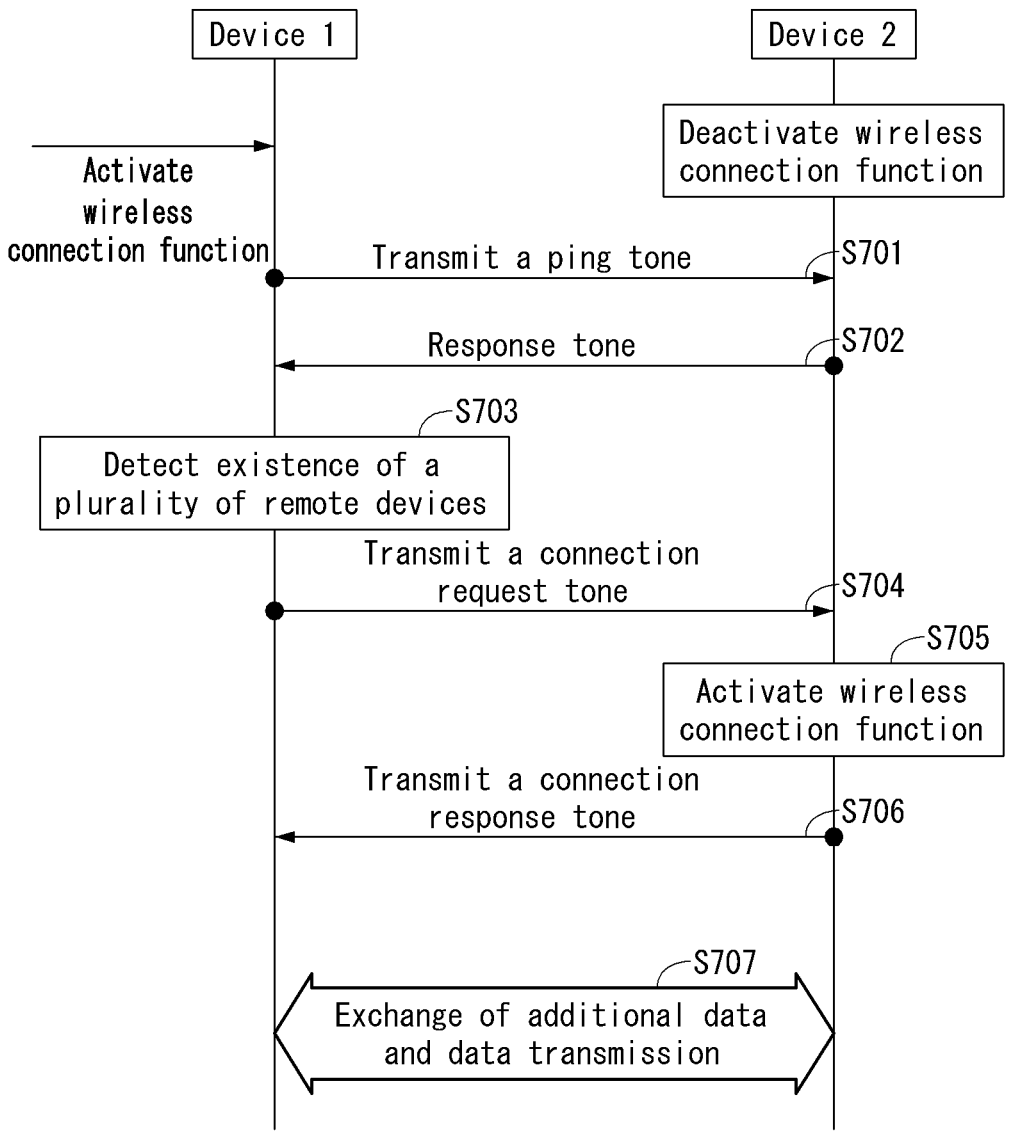
FIG. 7 illustrates one example of a method for activating a short range wireless communication function and requesting connection with respect to a single remote device according to the present invention.

FIG. 7 illustrates one example of a method for activating a short range wireless communication function and requesting connection with respect to a single remote device according to the present invention.

Device 1 is a device requesting wireless communication connection and can be denoted as an initiating device.

Device 2 refers to a remote device discovered by the Device 1, namely a remote device corresponding to an initiated device.

An initiating device can be denoted as a connection requesting device while a remote device can be denoted as a remotely connected device.

With reference to FIG. 7, the Device 1 outputs a tone having a specific pattern (frequency and duration) through a speaker to determine existence of remote devices corresponding to connection targets S701. At this time, the Device 1 corresponding to an initiating device.

Also, the tone used for discovering a device can be called a ping tone.

As described above, the ping tone refers to a sound signal of a specific pattern having specific frequency and specific time period (or duration time).

Prior to the S701 step, the Device 1 receives a user input indicating activation of a wireless connection function of the Device 1 and activates the wireless connection function.

In other words, in case the wireless connection function is activated, the Device 1 transmits a ping tone through a speaker to check whether one or a plurality of remote devices exist in the surroundings thereof.

Afterwards, the Device 2 receiving the ping tone through a microphone outputs a response tone including its own identification information through a speaker in response to the ping tone S702.

In other words, the Device 2 receiving the ping tone transmitted from the Device 1 through the microphone transmits a response tone to the Device 1 in response to the ping tone.

Afterwards, the Device 1 can determine through the response tone transmitted from the Device 2 that only the Device 2 exists in the surroundings of the Device 1 (or in a remote place) S703.

In other words, the Device 1 determines on the basis of the response tone whether a plurality of remote devices exist in the surroundings of the Device 1.

In the case of FIG. 7, receiving a response tone only from the Device 2, the Device 1 determines that a plurality of remote devices are not present in the neighborhood.

Additionally, after transmitting a ping tone, the Device 1 can wait for a predetermined time period until a response tone is received. In this case, the Device 1 can activate a timer related to discovery and wait for a response tone to be received until the timer is terminated.

Afterwards, the Device 1 outputs a connection request tone including information about the Device 1 through the speaker S704.

At this time, the information of the Device 1 included in the connection request tone refers to the information required at the time of performing short range wireless communication.

As one example, in case Bluetooth is used as a short range wireless communication technology, information of the Device 1 can be Bluetooth device address and native clock information.

In other words, the Device 1 transmits a connection request tone including information required at the time of connecting to a remote device to the Device 2 through an alternative carrier.

Afterwards, the Device 2 activates a short range wireless communication function used for connecting to the Device 1 on the basis of the received information of the Device 1 S705.

Afterwards, the Device 2 outputs a connection response tone including the information of the Device 2 through a speaker S706. At this time, the connection response tone refers to a response tone with respect to the connection request tone.

In case Bluetooth is used as a short range wireless communication technology, the information of the Device 2 can include Bluetooth device address and native clock.

In case the Device 1 performs reconnection to the Device 2 afterwards through the connection response tone including the information of the Device 2, the information of the Device 2 can be transmitted directly being included in the connection request tone without involving a transmission process for a ping tone.

Through the process above, the Device 1 can quickly perform a process for reconnecting to the Device 2 afterwards.

Next, the Device 1 and the Device 2 exchange additional information with each other and transmit and receive actual data S707.

Next, described will be a method for activating a wireless communication function and a method for requesting connection with respect to a plurality of remote devices by using the methods of FIGS. 3 to 6.

A method for activating a wireless communication function and requesting connection with respect to a plurality of remote devices can be realized with or without a method using a random back-off mechanism.

First, described will be a method for activating a wireless communication function and requesting connection with respect to a plurality of remote devices where a remote device does not employ a random back-off mechanism.

In case the Device 1 outputs a ping tone through a speaker and receives response tones from a plurality of remote devices (Device 2, Device 3, ..., Device N), the Device 1 determines that multiple remote devices are present and outputs a connection request with a user confirmation tone.

At this time, the connection request with a user confirmation tool is output to confirm connection from the user of a remote device so that only those remote devices capable of participating in the connection to the Device 1 can actually output response tones.

Figure 8:
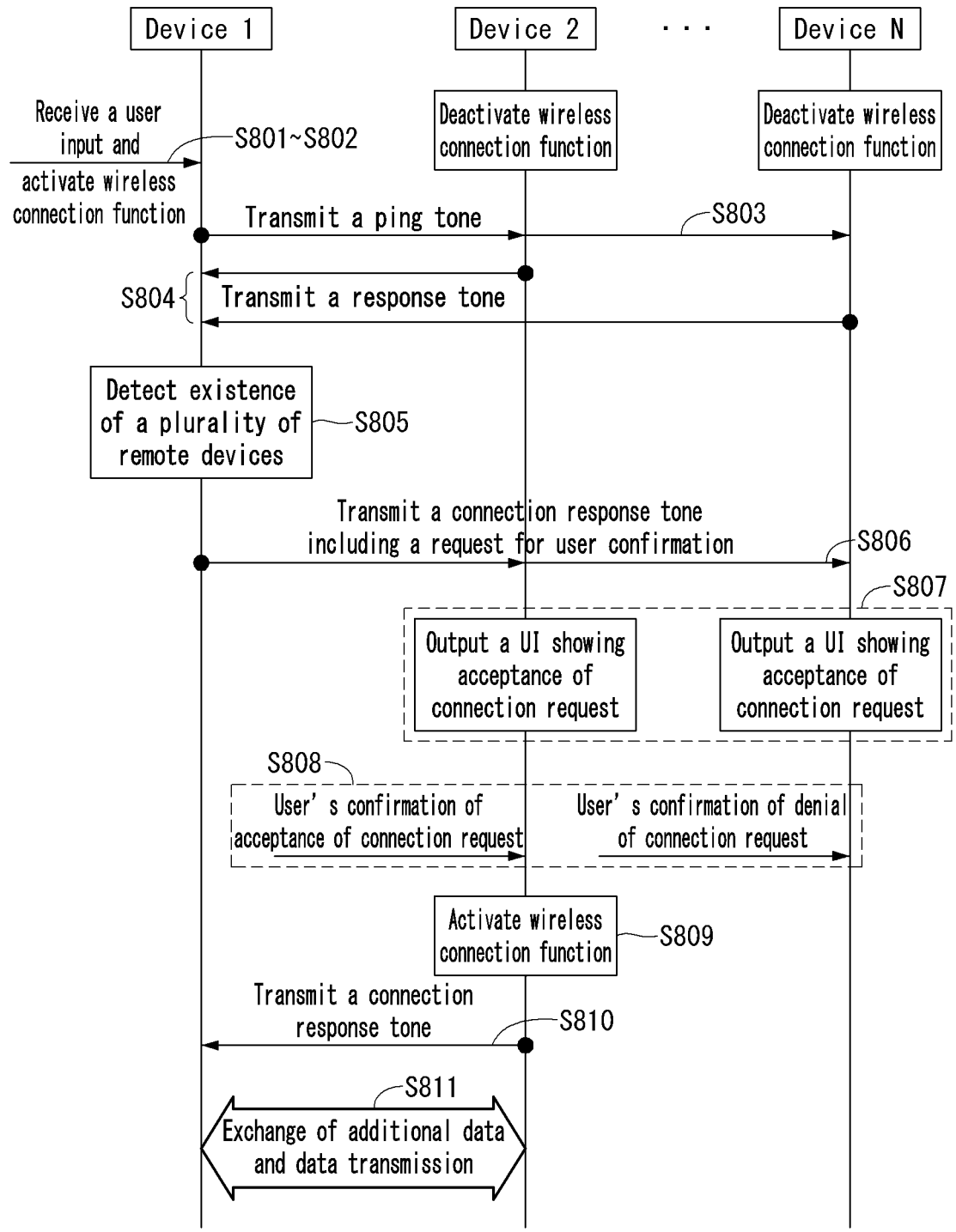
FIG. 8 is a flow diagram illustrating one example of a method for activating a short range wireless communication function and requesting connection with respect to a plurality of remote devices according to the present invention.

FIG. 8 is a flow diagram illustrating one example of a method for activating a short range wireless communication function and requesting connection with respect to a plurality of remote devices according to the present invention.

The flow diagram of FIG. 8 can be applied to all kinds of short range wireless communication corresponding to WPAN (Wireless Personal Area Network) including Wi-Fi, NFC, Bluetooth, UWB, and Zigbee.

Device 1 corresponds to an initiating device, and Device 2 to Device N correspond to remote devices.

With reference to FIG. 8, at first, wireless communication connection functions of the remote devices (Device 2 to Device N) are in a deactivated state.

Device 1 activates a wireless connection function by receiving a user input S801 which indicates activation of the wireless connection function of the Device 1 S802.

Afterwards, the Device 1 checks whether one or a plurality of remote devices exist in the surroundings thereof and transmits a ping tone through a speaker for waking up remote devices to be connected S803.

Next, remote devices transmit a response tone to the Device 1 in response to the received ping tone S804.

Afterwards, the Device 1 determines existence of a plurality of remote devices in the surroundings of the Device 1 on the basis of a response tone with respect to the ping tone S805.

In the case of FIG. 8, it is assumed that a plurality of remote devices transmit response tones to the Device 1.

Afterwards, in case the Device 1 confirms existence of a plurality of remote devices on the basis of received response tones, the Device 1 transmits a connection request tone to get approval of a connection request from a remote device to which the Device 1 wants to connect S806.

The connection request tone can include user confirmation triggering information and information required for connecting to a remote device.

Also, the connection request tone can be transmitted through an alternative carrier.

Afterwards, the remote devices which have received the connection request tone from the Device 1 outputs a UI showing whether to accept or deny connection to the Device 1 through the display unit by using the user confirmation triggering information S807.

Afterwards, the remote devices which have received the connection request tone receive a selection input for "connection approval" or "connection denial" from the user of each remote device S808.

As shown in FIG. 8, Device 2 receives an input from the user with respect to "approval of connection" to the Device 1, and other remote devices receive an input with respect to "denial of connection" to the Device 1.

Afterwards, the Device 2 receives an input from the user with respect to approval of connection and activates the wireless connection function S809.

Next, the Device 2 transmits a connection response tone including Device 2's device information to the Device 1 in response to the connection request tone S810.

Next, after exchanging additional information required for completing wireless communication connection with each other through an alternative carrier, the Device 1 and the Device 2 transmit and receive actual data S811.

Next, described will be a method activating a short range wireless communication function and requesting connection with respect to a plurality of remote devices by using a random back-off mechanism from a remote device.

After receiving a ping tone from an initiating device, a plurality of remote devices can perform random back-off individually to avoid collision of transmitted response tones among the remote devices before transmitting the response tones to the initiating device in response to the received ping tone.

In other words, each remote device checks whether there is a response tone transmitted from other remote devices in the neighborhood and transmits a response tone to the initiating device if it is found that there is no response tone transmitted from other remote devices.

If a response tone transmitted from other remote devices in the neighborhood is sensed, the remote device performs the random back-off until response tones transmitted from other remote devices are not sensed.

At this time, the remote device performing the random back-off can repeatedly perform the operation of sensing the response tone transmitted from other devices, and in case the sensing operation is performed repeatedly, the random back-off value may be set differently for each random back-off period.

The initiating device which has received a response tone performs collision monitoring with respect to a plurality of response tones.

At this time, if collision is detected, the initiating device transmits the ping tone periodically or repeatedly or for a predetermined number of times to the remote devices until collision is not detected.

If the initiating device does not detect collision, the initiating device transmits a connection request tone to the remote devices.

The remote devices which have received the connection request tone transmit a connection response tone to the initiating device in response to the connection request tone.

At this time, the connection response tone can be transmitted after random back-off time.

The random back-off employed in the process of transmitting the connection response tone can be the time obtained by multiplying the random back-off value when a response tone is sent with respect to the ping tone with the coefficient K which takes into account the length of the connection response tone.

In other words, random back-off (connection response tone) value=random back-off (response tone of the ping tone) value×coefficient K.

The remote device which has transmitted the connection response tone directly activates a short range wireless communication function to establish connection to the initiating device.

In case the initiating device receives a connection response tone from a plurality of remote devices, the initiating device can output a list of remote devices through the display unit to inform the user of the plurality of remote devices.

Through this operation, the user of the initiating device can select a remote device to which he or she want to connect, and the initiating device receives information of the selected remote device.

Afterwards, the initiating device transmits a connection request message including information of a selected remote device to the selected remote device by using the activated short range wireless communication technology.

The remote device which has received the connection request message performs communication with the initiating device by using the short range wireless communication technology.

At this time, the remote devices which have not received the connection request message automatically deactivates the activated short range wireless communication function.

Figure 9:
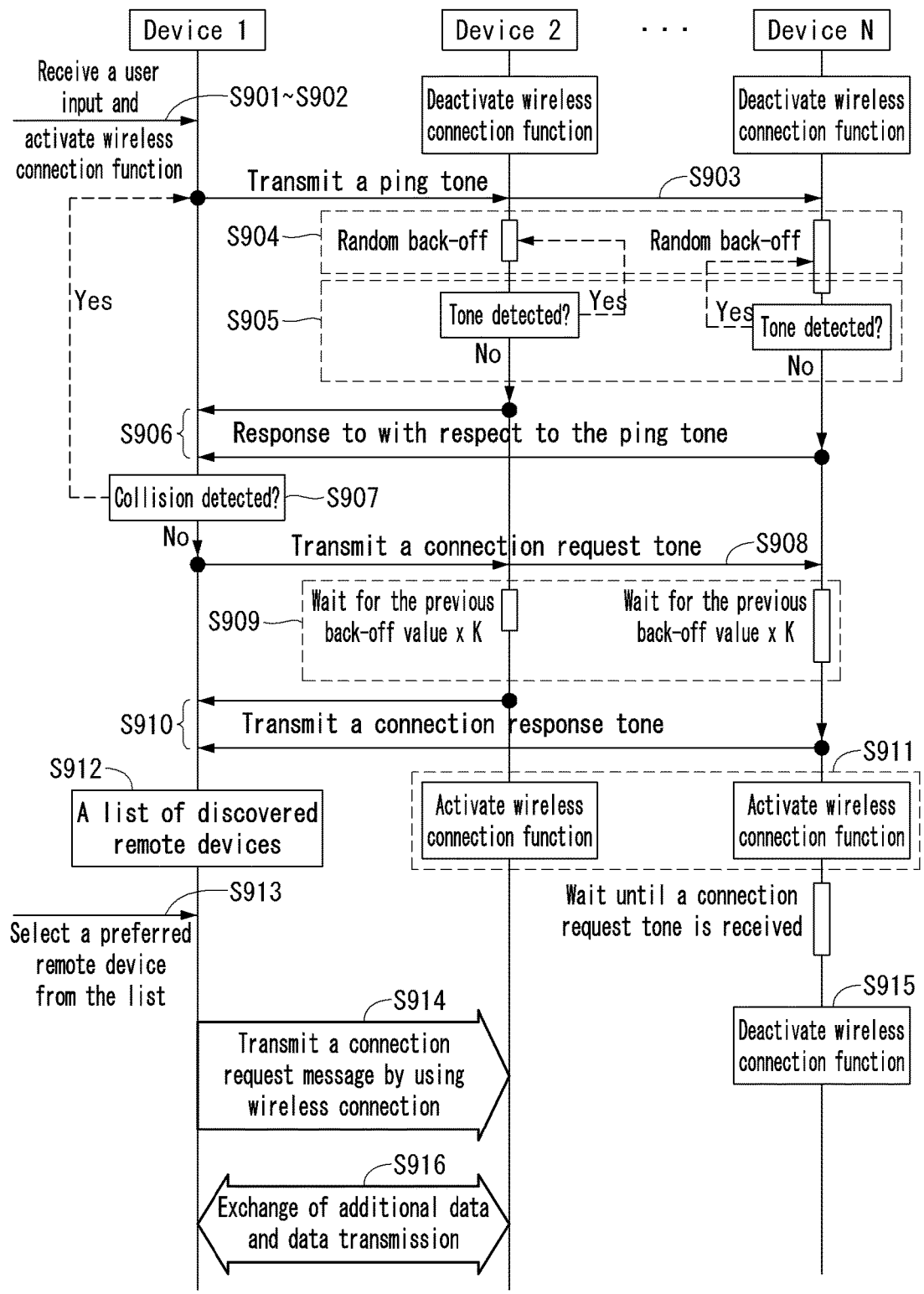
FIG. 9 is a flow diagram illustrating another example of activating a short range wireless communication function and requesting connection with respect to a plurality of remote devices according to the present invention.

FIG. 9 is a flow diagram illustrating another example of activating a short range wireless communication function and requesting connection with respect to a plurality of remote devices according to the present invention.

In FIG. 9, Device 1 represents an initiating device, and Device 2 to Device N represent remote devices.

Since the S901 to S903 steps are the same as the S801 to S803 steps of FIG. 8, detailed descriptions thereof will be omitted.

After the S903 step, the remote devices which have received a ping tone from Device 1 perform random back-off before transmitting a response tone S904.

At this time, the random back-off value can be configured differently for the respective remote devices.

Afterwards, the remote device which has performed the random back-off checks whether other remote devices transmit a response tone S905, and if transmission of a response tone from other remote devices is detected, the remote device can repeatedly perform the random back-off until transmission of a response tone from other remote devices is not detected.

Next, if transmission of a response tone from other remote devices is not detected, a response tone with respect to the ping tone is transmitted to the Device 1 S906.

Afterwards, the Device 1 checks collision among the response tones received from the remote devices S907 and if collision is detected, transmits a ping tone again to the remote devices, but transmits a connection request tone to the remote devices if collision is not detected S908.

At this time, the Device 1 can transmit information required for connecting to a remote device through an alternative carrier to remote devices by including the information in the connection request tone.

Afterwards, at the time of transmitting a connection response tone, the remote devices wait for the time corresponding to the last random back-off value at the S904 step multiplied by the coefficient K in order to avoid collision due to transmission of a connection request tone with other remote devices S909 and transmit the connection response tone to the Device 1 S910.

At this time, K is determined by the length of the connection response tone.

The length of the connection response tone can be longer than that of a response tone with respect to the ping tone which includes the information of the remote device.

Afterwards, the remote devices active the wireless connection function after transmitting the connection response tone to the Device 1 S911.

Afterwards, the Device 1 which has received the connection response tone outputs a list of discovered remote devices through the display unit S912.

At this time, the user of the Device 1 can select a remote device to which the user wants to connect from among the output list of remote devices.

Next, the Device 1 receives information about the selected remote device S913.

Next, the Device 1 transmits a connection request (message) to the remote device (Device 2) to which the user wants to connect wirelessly S914.

At this time, a remote device which has not received a connection request message wirelessly from the Device 1 for a predetermined time period automatically deactivates the activated wireless connection function S915.

Next, after exchanging additional information required for completing wireless communication connection with each other through an alternative carrier, the Device 1 and the Device 2 transmit and receive actual data S916.

Figure 10:
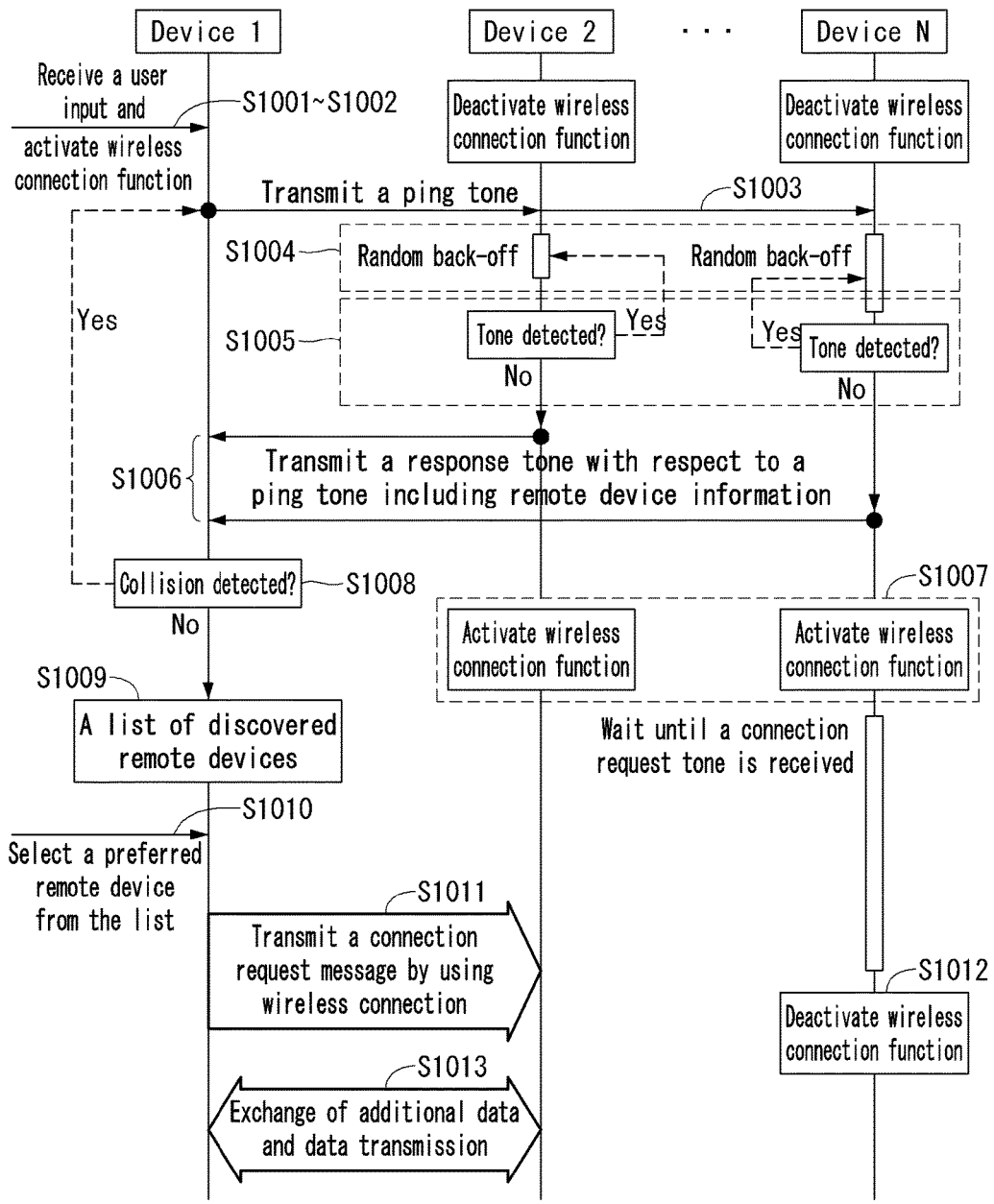
FIG. 10 is a flow diagram illustrating a yet another example of a method for activating a short range wireless communication function and requesting connection with respect to a plurality of remote devices according to the present invention.

FIG. 10 is a flow diagram illustrating a yet another example of a method for activating a short range wireless communication function and requesting connection with respect to a plurality of remote devices according to the present invention.

FIG. 10 illustrates a method for transmitting information of a remote device by including the information in a response tone with respect to a ping tone to perform much faster wireless communication connection to the remote device by using the method of FIG. 9.

In other words, Device 1 which has received a response tone with respect to a ping tone which includes information of a remote device outputs a list of remote devices through the display unit to inform the user of the list of remote devices, and the user selects a device to which the user wants to connect from the list of remote devices.

And the Device 1 transmits a connection request message which includes information of a selected device by using an activated short range wireless communication technology, and the remote device which has received the connection request message communicates with the Device 1 by using the activated short range wireless communication technology.

At this time, other remote devices which have failed to receive the connection request message automatically deactivate the activated short range wireless communication function.

Now, the operation above will be described in more detail with reference to FIG. 10.

Since the S1001 to S1005 steps are the same as the S901 to S905 steps of FIG. 9, detailed descriptions thereof will be omitted.

After the S1005 step, remote devices transmit a response tone which includes their device information to Device 1 which has transmitted a ping tone S1006.

In other words, if remote devices detect transmission of a response tone from other remote device, the remote devices performs random back-off repeatedly until a response tone transmitted from other remote device is not detected; if a response tone transmitted from other remote device is not detected, the remote devices transmit a response tone to the Device 1 which has transmitted a ping tone.

The remote devices activate a wireless connection function after transmitting a response tone S1007.

Afterwards, the Device 1 checks occurrence of collision among response tones received from the remote devices S1008.

If collision is detected in the S1008 step, the Device 1 transmits a pint tone again to the remote devices.

At this time, in the case of FIG. 10, since Device 1 has received information of a remote device through a response tone, Device 1 does not transmit a connection request tone to the remote devices to obtain information of each remote device.

Therefore, after the S1008 step, the Device 1 outputs a list of discovered remote devices through the display unit to provide the list to the user S1009.

The S1009 step is performed when the Device 1 fails to detect collision occurred at the S1008 step.

At this time, the user of the Device 1 selects a remote device to which the user want to connect from the list of remote devices displayed.

Afterwards, the Device 1 receives an input with respect to the selected remote device from the user S1010.

Next, the Device 1 transmits a connection request (message) to the remote device, namely Device 2 to which the user wants to connect wirelessly S1011.

At this time, the connection request message can be a paging message if the wireless connection function corresponds to a Bluetooth connection function.

At this time, a remote device which has not received a connection request message wirelessly from the Device 1 for a predetermined time period automatically deactivates the activated wireless connection function S1012.

Next, after exchanging additional information required for completing wireless communication connection with each other through an alternative carrier, the Device 1 and the Device 2 transmit and receive actual data S1013.

According to the method illustrated with reference to FIG. 10, information of a remote device can be readily obtained through a response tone; therefore, a procedure for obtaining information of a remote device among remote devices can be omitted, which allows a connection to a remote device to be performed more quickly.

Figure 11:
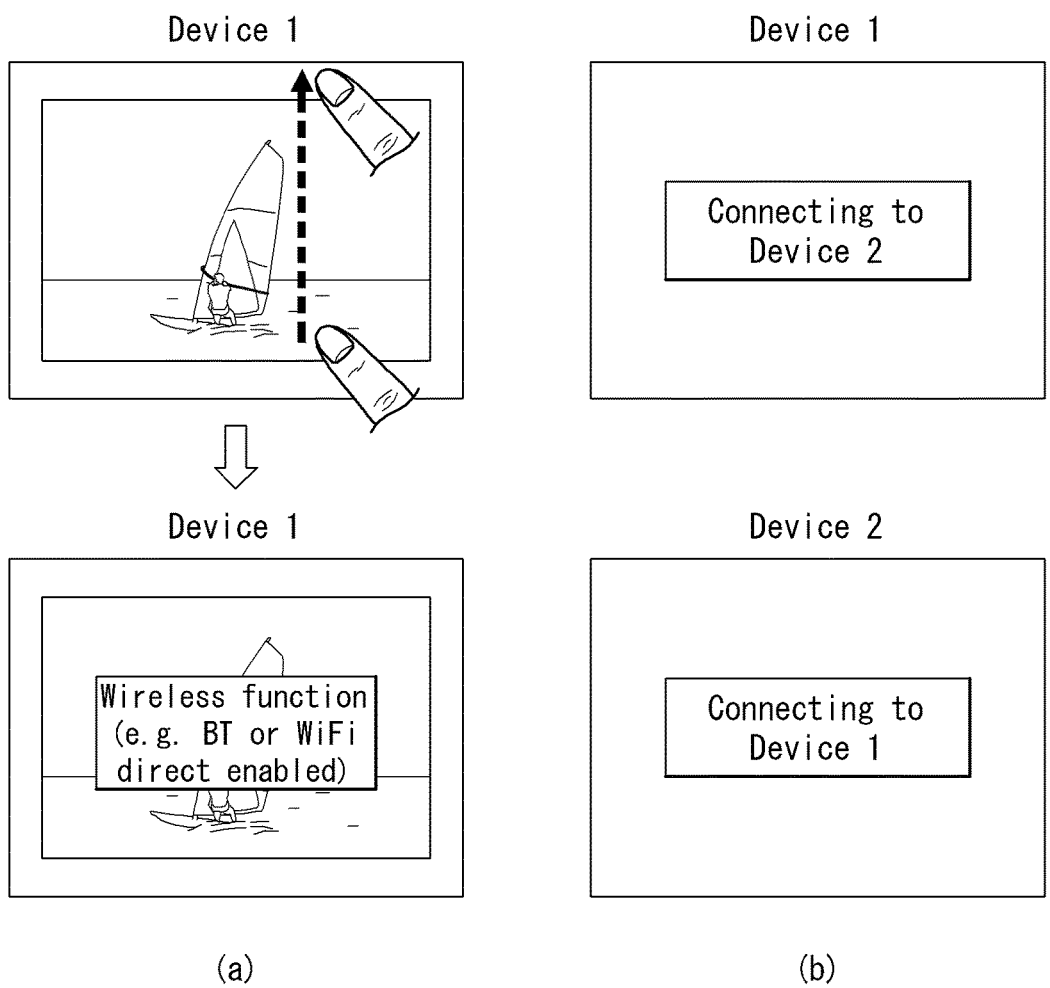
FIG. 11 illustrates one example of a UI displayed through display units of an initiating device and a remote device of FIG. 7.

FIG. 11 illustrates one example of a UI displayed through display units of an initiating device and a remote device of FIG. 7.

FIG. 11a illustrates a user action performed in Device 1 for activating a wireless connection function of an initiating device whereby the initiating device can transmit a specific item or specific contents to a remote device.

FIG. 11b illustrates one example of a UI displayed through the display units of Device 1 and Device 2 after the S706 step of FIG. 7. In other words, FIG. 11b shows screens indicating that each device is performing a wireless communication connection procedure with another device.

Figure 12:
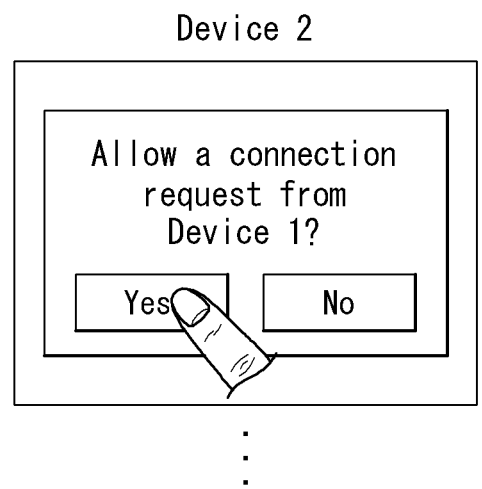
FIG. 12 illustrates one example of a UI displayed through a display unit of a remote device of FIG. 8.
Figure 12:
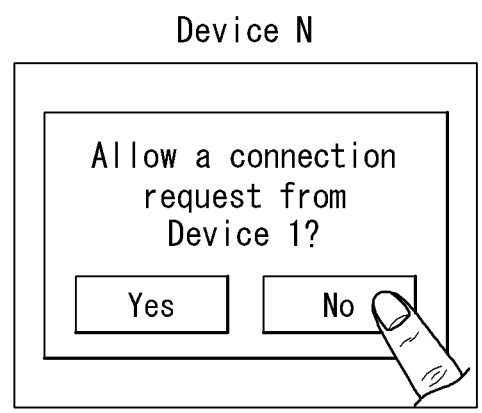

FIG. 12 illustrates one example of a UI displayed through a display unit of a remote device of FIG. 8.

More specifically, FIG. 12 illustrates one example of a UI displayed in the Device 2 at the S807 step of FIG. 8.

Figure 13:
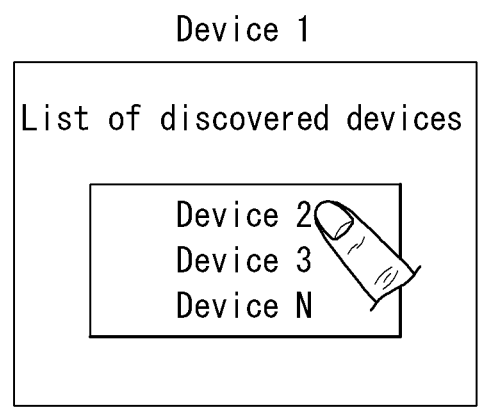
FIG. 13 illustrates one example of a UI displayed through a display unit of an initiating device of FIG. 9.

FIG. 13 illustrates one example of a UI displayed through a display unit of an initiating device of FIG. 9.

More specifically, FIG. 13 illustrates one example of a UI displayed in the Device 1 at the S912 step of FIG. 9.

In what follows, described in detail will be a method for applying the methods described with reference to FIGS. 3 to 6 when Bluetooth is used for establishing a connection between devices.

Figure 14:
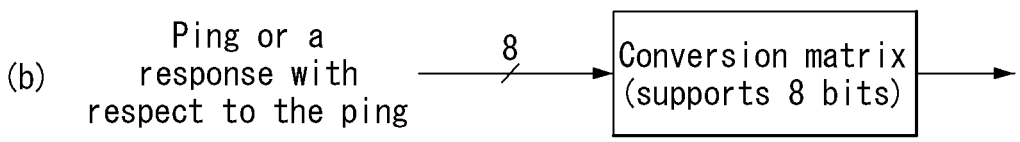
FIG. 14 illustrates one example of a conversion matrix where Bluetooth is used for wireless connection among devices and a method for converting input binary data to a sound signal according to the present invention.
Figure 14:
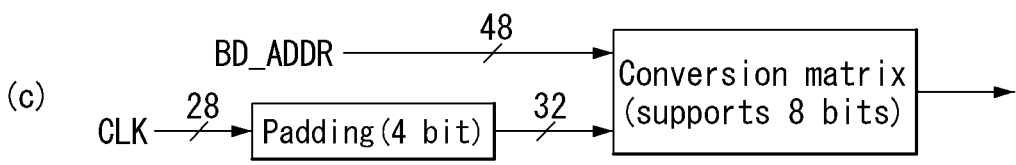

With reference to FIG. 14, described first will be a method for converting binary data input through Bluetooth communication into a sound signal and a conversion matrix defined for the conversion.

FIG. 14 illustrates a conversion matrix when Bluetooth is employed for wireless connection between devices one example of a method for converting input binary data to a sound signal according to the present invention.

FIG. 14a is one example of a conversion matrix that can be used in Bluetooth communication, and FIGS. 14b and 14c illustrate one example of binary data representation with respect to the tones described with reference to FIGS. 3 to 6.

The conversion matrix of FIG. 14a defines the frequency range of a sound signal to be converted to be 1 to 8 octaves, where each octave has twelve notes, and duration time of a sound signal to be converted comprises T1 to T3.

The conversion matrix of FIG. 14a is an example where binary data input to the data processing device is fragmented in units of 8 bits; if the fragmentation is expressed in the frequency domain, a total of 256 ($2^8$) cases can exist.

In other words, since a total number of expressions that can be obtained for one duration time is 96 (12 frequencies×8 octaves), the number of duration time required for the conversion matrix to convert the whole binary data in units of 8 bits to a sound signal will be 3 (256/96=2.xx).

FIG. 14b illustrates one example of a process where a ping tone and a response tone with respect to the ping tone are generated by the conversion matrix, and ping data of 8 bits comprising a bit sequence of a specific pattern or response data with respect to the ping data are converted respectively to a ping tone and a response tone with respect to the ping tone according to the conversion matrix which supports a length of 8 bit.

At this time, since ping data and response data with respect to the ping data are 8 bits respectively and are converted directly to a sound signal having specific frequency and specific duration time according to the mapping table defined in the conversion matrix, a padding procedure and a partitioning procedure are not performed.

FIG. 14c illustrates a case where a connection request tone and a connection response tone are generated through the conversion matrix.

The information of a device requesting connection through the connection request tone or the information of a device transmitting the connection response tone include BD_ADDR (Bluetooth Device Address) of 48 bits and native clock (CLK) information of 28 bits.

At this time, BD_ADDR information of 48 bits is a multiple of 8 and is input directly to the conversion matrix without undergoing a padding procedure, being converted to a sound signal comprising a total of 6 (=48/8) specific patterns.

However, since native CLK information of 28 bits is not a multiple of 8, four padding bits (0000 or 1111) are added to the native CLK before being input to the conversion matrix which supports a length of a multiple of 8 bits, after which the native CLK with padding bits has a length of 32 bit and is input to the conversion matrix.

In other words, the native CLK information of 28 bits is padded with 4 bits to generate information comprising 32 bits so that it can be mapped to the conversion matrix which is fragmented in units of 8 bits.

Afterwards, the native CLK information corresponding to 32 bit is input to the conversion matrix and is converted to a sound signal of a specific pattern comprising a total of 4 (=32/8) specific patterns.

At this time, the BD_ADDR information of 48 bits and the native CLK information of 28 bits may be processed in a parallel or sequential fashion.

At this time, the BD_ADDR information represents the address of 48-bit Bluetooth device, and CLK represents the Bluetooth clock information of 28 bits.

As another example, an Access Point (AP) transmitting a response with respect to a connection request through Wi-Fi infrastructure can transmit the AP's SSID (Service Set Identifier) information to a device which has transmitted the connection request by including the SSID information in a connection response tone.

As a yet another example, a device transmitting a response with respect to a connection request through Wi-Fi P2P (Peer-to-Peer) connection can transmit operation channel, WSC_IE, and supported channel list to the device which has requested for connection by including them in a connection response tone.

Figure 15:
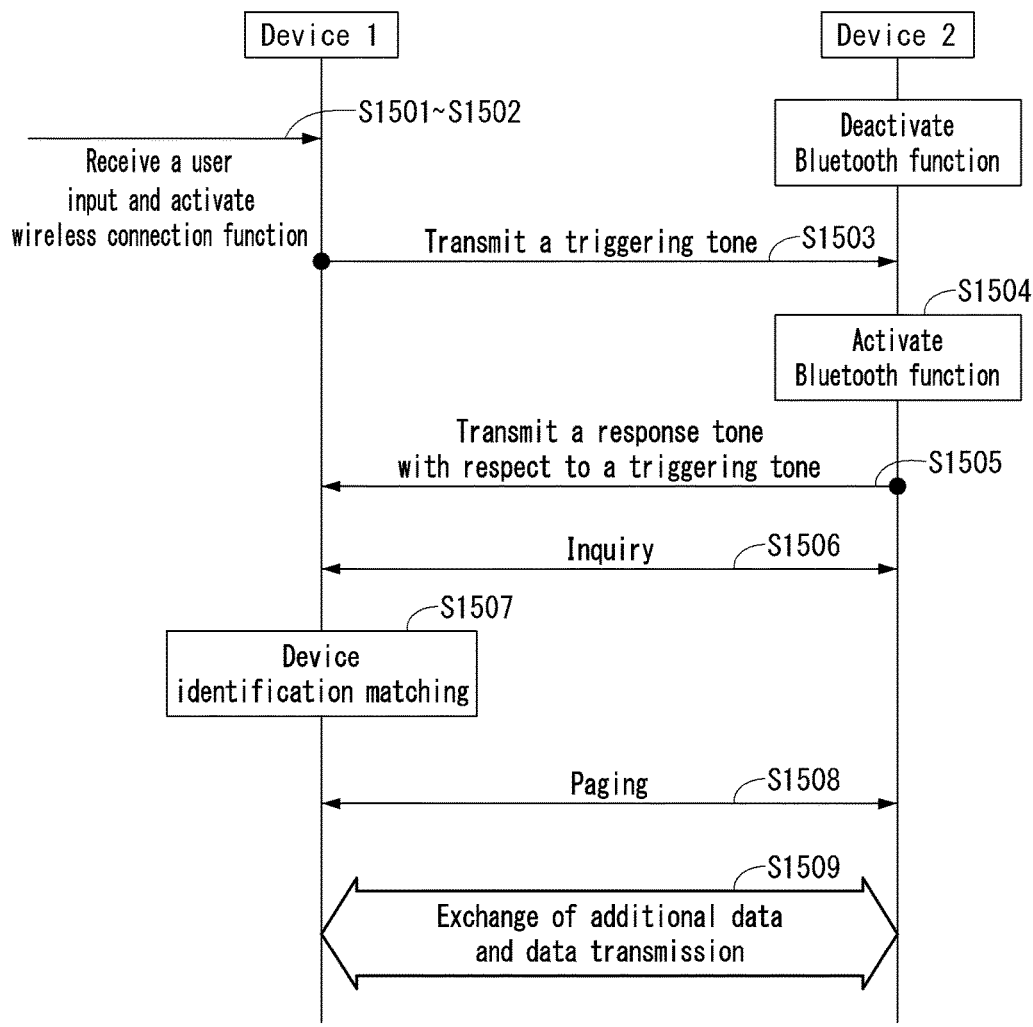
FIG. 15 is a flow diagram illustrating one example of a method for activating a Bluetooth function and a method for requesting Bluetooth connection according to the present invention.

FIG. 15 is a flow diagram illustrating one example of a method for activating a Bluetooth function and a method for requesting Bluetooth connection according to the present invention.

In the case of FIG. 15, Device 1 corresponds to an initiating device which requests a Bluetooth communication connection, and Device 2 corresponds to a remote device corresponding to an initiated device.

It is assumed that both of the Device 1 and the Device 2 support Bluetooth communication.

As shown in FIG. 15, the Device 1 activates the Bluetooth communication function S1502 after receiving a user input which indicates activation of the Bluetooth communication function S1501. At this time, the Bluetooth communication function of the Device 2 has not been activated yet.

In other words, the Device 1 can receive a user input which selects an item that the user wants to transmit to another device and receive a specific input which indicates activation of a Bluetooth communication function before the Bluetooth communication function is activated.

The specific input can be a visual, aural, or tactile input.

Afterwards, the Device 1 transmits a triggering tone in a specific form to activate the Bluetooth communication function of the Device 2 S1503.

The triggering tone in a specific form refers to a sound signal converted from binary data by the conversion matrix described above.

Afterwards, the Device 2 activates the Bluetooth communication function S1504.

At this time, the S1504 step may be performed after receiving a confirmation input with respect to activation of a communication function from the user.

Afterwards, the Device 2 includes its own information in a response tone with respect to the triggering tone and transmits the information to the Device 1 S1505.

Afterwards, the Device 1 searches for the Device 2 by performing an inquiry procedure as a Bluetooth device discovery process S1506.

In other words, the S1501 to S1505 steps correspond to a process of activating the Bluetooth communication function of a remote device in the vicinity of the initiating device and obtaining information of the remote device.

Afterwards, the Device 1 matches the information about the Device 2 received through a response to the triggering tone and the information about the Device 2 found through the inquiry procedure S1507.

After the matching procedure is completed through the S1507 step, the Device 1 automatically requests paging from the Device 2 S1508.

Next, the Device 1 and the Device 2 exchange additional information for completing Bluetooth communication connection through an alternative carrier and transmit and receive actual data 51509.

At this time, the additional information exchanged can be the information exchanged through a service discovery procedure, secure simple pairing procedure, and so on.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

A method for providing a wireless docking service according to the present invention is not limited to the embodiments described above, but the entire embodiments can be combined or part of the embodiments can be combined selectively so that various modifications can be made to the embodiments.

Meanwhile, a method for providing a wireless docking service according to the present invention can be implemented in the form of processor-readable program codes in a recording medium that can be read by a processor installed in a network device. The processor readable recording medium includes all kinds of recording devices storing data that can be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium can be distributed across computer systems connected to each other through a network, and program codes that can be read by the processor can be stored and run in a distributed manner.

Throughout the document, preferred embodiments of the present invention have been described with referenced to appended drawings; however, the present invention is not limited to the embodiments above. Rather, it should be noted that various modifications of the present invention is made by those skilled in the art to which the present invention belongs without leaving the technical scope of the present invention defined by the appended claims, and these modifications should not be understood individually from the technical principles or aspects of the present invention.

This document describes both of the product invention and process invention, and depending on the needs, descriptions of both inventions can be applied in a complementary manner.

INDUSTRIAL APPLICABILITY

The present invention can perform wireless connection among devices in a wireless communication system.

The invention claimed is:

1. A method for performing wireless connection among devices in a wireless communication system, the method performed by a first device, comprising:
   activating a wireless connection function;
   transmitting a ping tone for discovering one or more second devices in the surroundings;
   receiving a response tone with respect to the ping tone from the one or more second devices;
   based on the received response tone, transmitting a connection request tone for requesting wireless connection to the second device; and
   receiving a connection response tone corresponding to a response of the connection request tone from the second device,
   wherein the ping tone, the response tone, the connection response tone, and the connection response tone are generated by a conversion matrix, and
   wherein the conversion matrix converts an input binary data to a sound signal having specific frequency and specific duration time.

2. The method of claim 1, wherein the transmitting a connection request tone further comprises outputting a list of the one or more second devices through an output unit in case a response tone is received from the one or more second devices; and
   transmitting the connection request tone to one of the one or more second devices.

3. The method of claim 2, further comprising
   if a response tone is received from the one or more second devices, checking whether collision of the received response tone occurs; and
   if the collision of the received response tone occurs, retransmitting the ping tone to the one or more devices.

4. The method of claim 1, wherein generation of the ping tone, the response tone, the connection request tone, and the connection response tone comprises receiving binary data of N bits; and converting the received binary data to a sound signal of a specific pattern by using a conversion matrix defined by frequency and duration time.

5. The method of claim 4, further comprising comparing a bit length of the received binary data with a bit length that the conversion matrix supports;

as a comparison result, if a bit length of the received binary data is large, adding a predetermined number of padding bits to the bit length of the received binary data so that the bit length of the received binary data can be an integer multiple of the bit length that the conversion matrix supports;

partitioning the binary data with the additional padding bits by units of the bit length that the conversion matrix supports; and processing the individual partitioned binary data in a sequential or parallel manner by using the conversion matrix.

6. The method of claim 1, wherein a response tone in response to the ping tone and the connection response tone are received from the one or more second devices after random back-off.

7. The method of claim 6, wherein a random back-off value with respect to the connection response tone is the value obtained by multiplying the last random back-off value of a response tone with respect to the ping tone with a coefficient K which takes into account the length of a connection response tone.

8. The method of claim 1, wherein the connection request tone includes information related to the first device required for the wireless connection, and the connection response tone includes information related to the second device required for the wireless connection.

9. The method of claim 8, wherein information related to the first device includes at least one of address information of the first device or native clock information.

10. The method of claim 1, wherein the first device is an initiating device, and the second device is a remote device corresponding to an initiated device.

11. A method for performing wireless connection among devices in a wireless communication system, the method performed by a second device, comprising:

receiving a ping tone for discovering neighboring devices from a first device;

transmitting a response tone with respect to the ping tone from the first device;

receiving a connection request tone for requesting wireless connection from the first device;

transmitting a connection response tone to the first device in response to the connection request tone; and activating the wireless connection function, wherein the ping tone, the response tone, the connection request tone, and the connection response tone are generated by a conversion matrix, and wherein the conversion matrix converts an input binary data to a sound signal having specific frequency and specific duration time.

12. The method of claim 11, further comprising performing random back-off after receiving the ping tone and the connection request tone.

13. The method of claim 12, further comprising checking a response tone with respect to the ping tone of neighboring remote devices and transmission of the connection response tone; and re-performing the random back-off a predetermined number of times in case a response tone with response to the ping tone of the neighboring remote devices and transmission of the connection response tone are detected from the checking result.

14. The method of claim 12, wherein a random back-off value with respect to the connection response tone is the value obtained by multiplying the last random back-off value of a response tone with respect to the ping tone with a coefficient K which takes into account the length of a connection response tone.

15. The method of claim 11, wherein the connection request tone includes information related to the first device required for the wireless connection, and the connection response tone includes information related to the second device required for the wireless connection.

16. The device of claim 11, wherein the controller is configured to output a list of the one or more second devices through an output unit in case a response tone is received from the one or more second devices and to transmit the connection request tone to one of the one or more second devices.

Also, according to the present invention, in case a response tone with respect to the ping tone includes information related to a second device, the connection response tone is not transmitted to the first device.

17. The device of claim 16, wherein the controller is configured to check collision of a received response tone if the response tone is received from the one or more second devices and in the case of collision of the response tone, to retransmit the ping tone to the one or more second devices.

18. A method for performing wireless connection among devices in a wireless communication system, a first device, comprising:

a communication unit for transmitting and receiving a signal to and from the outside in a wired and/or wireless manner; and a controller functionally connected to the communication unit, wherein the controller is configured to activate a wireless connection function, transmit a ping tone for discovering one or more second devices in the surroundings, receive a response tone with respect to the ping tone from the one or more second devices, based on the received response tone, transmit a connection request tone for requesting wireless connection to a second device, and receive a connection response tone corresponding to a response of the connection request tone from the second device, wherein the connection request tone includes information related to the first device required for the wireless connection;

the ping tone, the response tone, the connection request tone, and the connection response tone are generated by a conversion matrix;

and the conversion matrix converts an input binary data to a sound signal having specific frequency and specific duration time.

19. The device of claim 18, further comprising a data processing device functionally connected to the communication unit and the controller, wherein the data processing device receives binary data of N bits and converts the input binary data to a sound signal of a specific pattern by using a conversion matrix defined in terms of frequency and duration time.

20. The device of claim 19, wherein the data processing device comprises
- a comparing unit comparing a bit length of input binary data with a bit length that the conversion matrix supported;
- a padding unit adding a predetermined number of padding bits to a bit length of the input binary data so that the bit length of the input binary data can be an integer multiple of the bit length that the conversion matrix supports;
- a partitioning unit partitioning the binary data with the additional padding bits by units of the bit length that the conversion matrix supports; and
- a converting unit converting the individual partitioned binary data in a sequential or parallel manner by using the conversion matrix.

* * * * *